(12) United States Patent
Russ et al.

(10) Patent No.: US 12,056,727 B2
(45) Date of Patent: *Aug. 6, 2024

(54) UNLOCKABLE ELECTRONIC INCENTIVES

(71) Applicant: IGT, Las Vegas, NV (US)

(72) Inventors: Michael Russ, Graz (AT); Sven Aurich, Schwanberg (AT); Elisabeth Kiss, Unterpremstätten (AT); Julia-Ines Lerchbaumer, Spielfeld (AT); Gernot Hoefler, Thal (AT); Roland Krainz, Graz (AT)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,475

(22) Filed: May 5, 2022

(65) Prior Publication Data
US 2022/0261832 A1 Aug. 18, 2022

Related U.S. Application Data

(63) Continuation of application No. 16/161,844, filed on Oct. 16, 2018, now Pat. No. 11,367,095.

(51) Int. Cl.
| | | |
|---|---|---|
| *G06Q 30/00* | (2023.01) | |
| *G06Q 30/0207* | (2023.01) | |
| *G06Q 50/34* | (2012.01) | |
| *G07F 17/32* | (2006.01) | |

(52) U.S. Cl.
CPC ......... *G06Q 30/0209* (2013.01); *G06Q 50/34* (2013.01); *G07F 17/3223* (2013.01); *G07F 17/323* (2013.01); *G07F 17/3258* (2013.01)

(58) Field of Classification Search
CPC .......... G06Q 30/0209; G06Q 50/34; G07F 17/3223; G07F 17/323; G07F 17/3258
See application file for complete search history.

(56) References Cited

U.S. PATENT DOCUMENTS

| | | | |
|---|---|---|---|
| 2007/0275777 A1* | 11/2007 | Walker | G07F 17/3244 463/16 |
| 2008/0020846 A1* | 1/2008 | Vasquez | G07F 17/32 463/42 |

(Continued)

OTHER PUBLICATIONS

Lewis, K. de Salas and L. Wells, "Features of Achievement systems," Proceedings of CGAMES'2013 USA, 2013, pp. 66-73, doi: 10.1109/CGames.2013.6632608. (Year: 2013).*

(Continued)

*Primary Examiner* — Sun M Li
(74) *Attorney, Agent, or Firm* — Sage Patent Group

(57) ABSTRACT

A system sends the identification of an electronic incentive award that a player may into a mobile device. The electronic incentive award may be sent in response to the player performing an action to complete an incentive objective on an electronic gaming machine (EGM). The system receives incentive progress data that corresponds to the action to complete the incentive objective. The incentive progress data indicates player progress towards completing the incentive objective. In response to the incentive progress data indicating that the player has completed the incentive objective, the system provides the electronic incentive award to the mobile device for the player to use on the mobile device.

17 Claims, 11 Drawing Sheets

(56) References Cited

U.S. PATENT DOCUMENTS

2013/0090158 A1\* 4/2013 Hornik ............... G07F 17/3255
                                                                463/25
2014/0045586 A1\* 2/2014 Allen ................. G07F 17/3241
                                                                463/25

OTHER PUBLICATIONS

J. V. Nickerson and A. Monroy-Hernández, "Appropriation and Creativity: User-Initiated Contests in Scratch," 2011 44th Hawaii International Conference on System Sciences, Kauai, HI, USA, 2011, pp. 1-10, doi: 10.1109/HICSS.2011.75. (Year: 2011).\*
C. Sotirakou and C. Mourlas, "Designing a gamified News Reader for mobile devices," 2015 International Conference on Interactive Mobile Communication Technologies and Learning (IMCL), Thessaloniki, Greece, 2015, pp. 332-337, doi: 10.1109/IMCTL.2015.7359614. (Year: 2015).\*
Lewis, K. de Salas and L. Wells, "Features of Achievement systems," Proceedings of CGAMES'2013 USA, 2013, pp. 66-73, doi: 10.1109/CGames.2013.6632608. GSA (Year: 2013) (Year: 2013).\*

\* cited by examiner

UNLOCKABLE ELECTRONIC INCENTIVES

BACKGROUND

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. The outcomes of such events are purely random or pseudo-random, and indeed, the requirement for randomness or pseudo-randomness of the outcomes is regulated in many jurisdictions.

Gambling on these systems may be contrasted with some other types of gambling, such as blackjack and poker, in which a player may increase their chance of winning a wager by playing the game with some level of skill relative to other players. Even in those games, however, a player cannot readily overcome the inherent randomness and odds of the game regardless of the player's skill.

There are many EGMs that are competing for players. As such, EGM manufacturers are actively seeking different ways to attract players and to generate repeat play on specific games and/or games from specific manufacturers.

SUMMARY

Some embodiments are directed to a system that includes a processing circuit, a communication interface that is communicatively coupled to the processing circuit and that sends and receives data, and a memory device storing instructions which, when executed by the processing circuit, cause the processing circuit to operate to send, via the communication interface and to a mobile device that is associated with a player, an identification of an electronic incentive award that the player receives into the mobile device responsive to performing an action to complete an incentive objective on an electronic gaming machine (EGM), receive, via the communication interface and from the EGM, incentive progress data that corresponds to the action to complete the incentive objective and that indicates player progress towards completing the incentive objective, and responsive to the incentive progress data indicating that the player has completed the incentive objective, provide the electronic incentive award to the mobile device for the player to use on the mobile device.

Some embodiments are directed to a device that includes a processing circuit, a communication interface that is communicatively coupled to the processing circuit and that sends and receives data, a graphical user interface, and a memory device storing instructions which, when executed by the processing circuit, cause the processing circuit to receive, via the communication interface, data including an identification of each of multiple electronic incentive awards that correspond to an electronic gaming machine (EGM) and multiple actions to complete respective ones of a plurality of incentive objectives on the EGM. A completed one of the incentive objectives causes a corresponding one of the electronic incentive awards to be unlocked and available for a player to use. The processing circuit may be further caused to display the identification of each of the electronic incentive awards on the graphical user interface, receive a user input corresponding to the identification of a selected one of the electronic incentive awards via the graphical user interface, and display, via the graphical user interface, information corresponding to one of multiple actions that corresponds to the selected one of the electronic incentive awards.

Some embodiments herein are directed to a computer implemented method that includes sending, via a communication interface and to a mobile device that is associated with a player, an identification of an electronic incentive award that the player receives into the mobile device responsive to performing an action to complete an incentive objective on an electronic gaming machine (EGM). The mobile device is associated with the EGM before the identification of the electronic incentive award is sent to the mobile device. Operations include receiving, via the communication interface and from the EGM, incentive progress data that corresponds to the action to complete the incentive objective and that indicates player progress towards completing the incentive objective, responsive to the incentive progress data indicating that the player has completed the incentive objective, providing the electronic incentive award to the mobile device for the player to use on the mobile device, and sending, via the communication interface and to the EGM for the EGM to display to the player, the identification of the electronic incentive award that the player is eligible for.

DETAILED DESCRIPTION

Embodiments of the inventive concepts provide unlockable electronic EGM give-away incentives that may be delivered on a mobile device. The electronic gaming industry may enhance a player's experience by developing a player awareness and provider relationship with EGM manufacturers. In addition to possibly attracting new players and increasing their enjoyment of electronic wagering games, the use of electronic unlockable incentives may garner brand loyalty to specific EGM manufacturers. Providing the ability to earn unlockable electronic incentives may also remind players of specific gaming experiences when the players are not at a gaming casino and may encourage players to return to the casino to enjoy playing the EGM again. In this manner, overall player adoption and loyalty to an EGM may be increased to ultimately, increase the total amount wagered by players on the game.

Electronic Gaming Machines

Figure 1A:
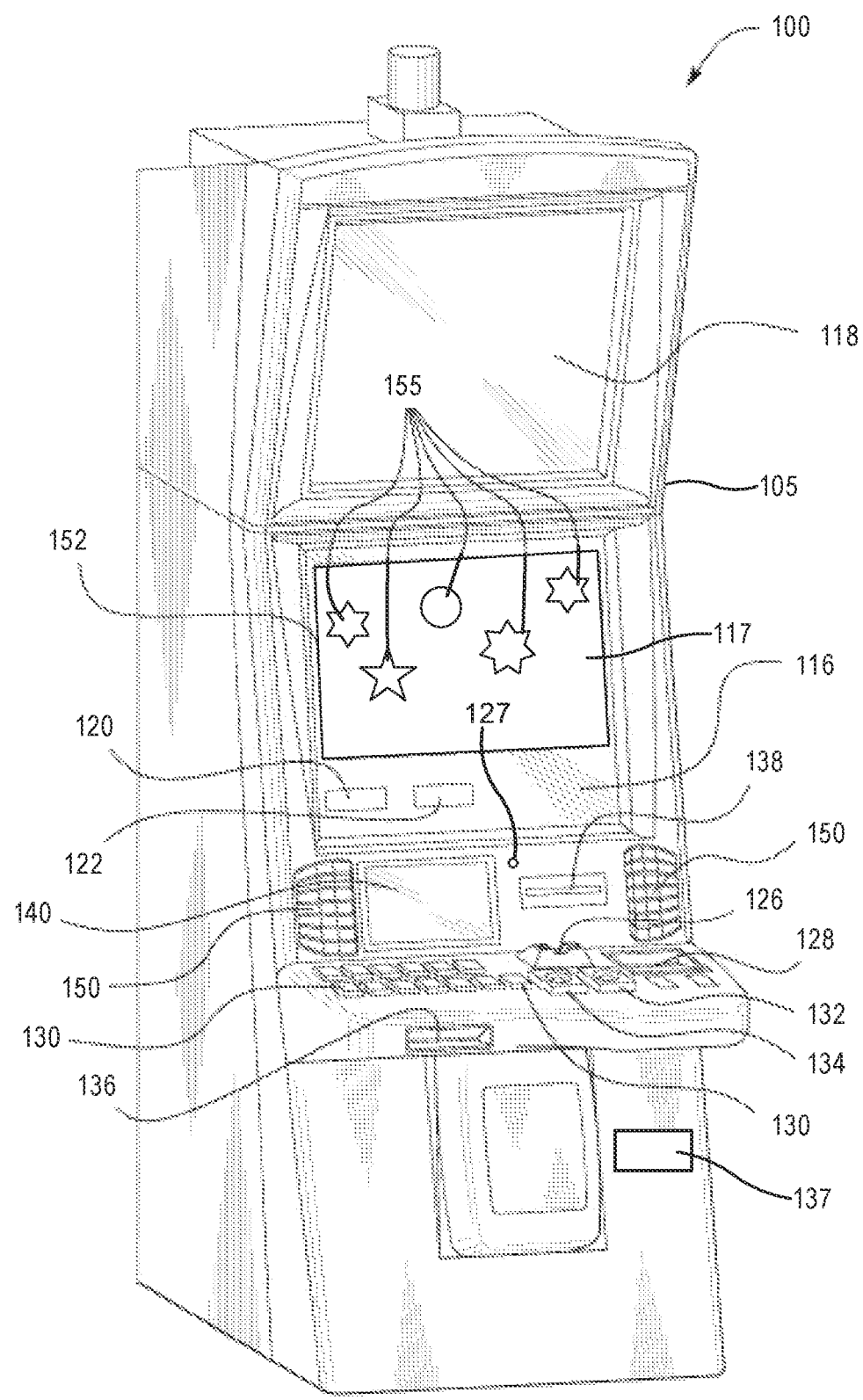
FIG. 1A is a perspective view of an electronic gaming device that can be configured according to some embodiments.
Figure 1B:
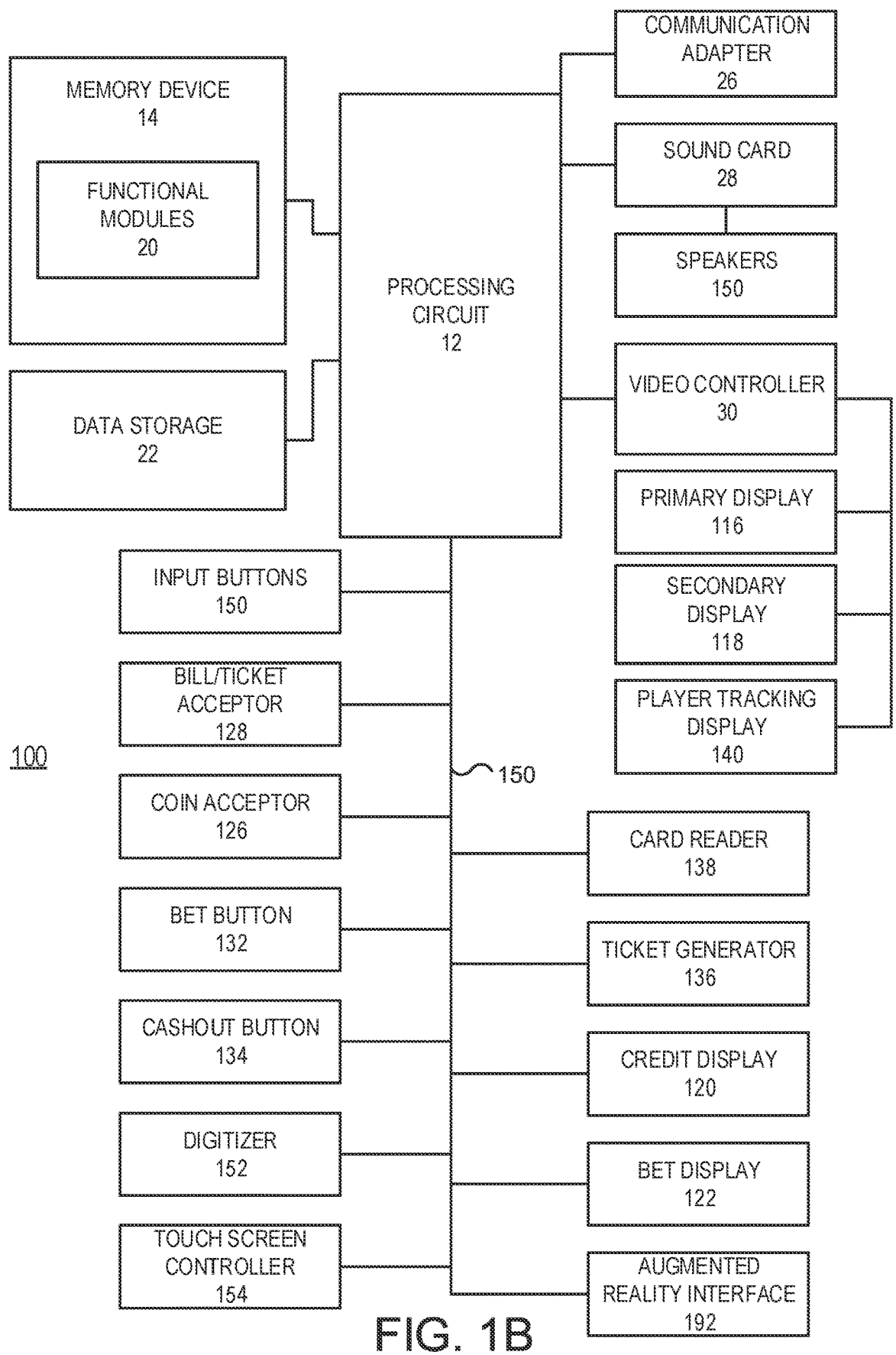
FIG. 1B is a schematic block diagram illustrating an electronic configuration for a gaming device according to some embodiments.
Figure 1C:
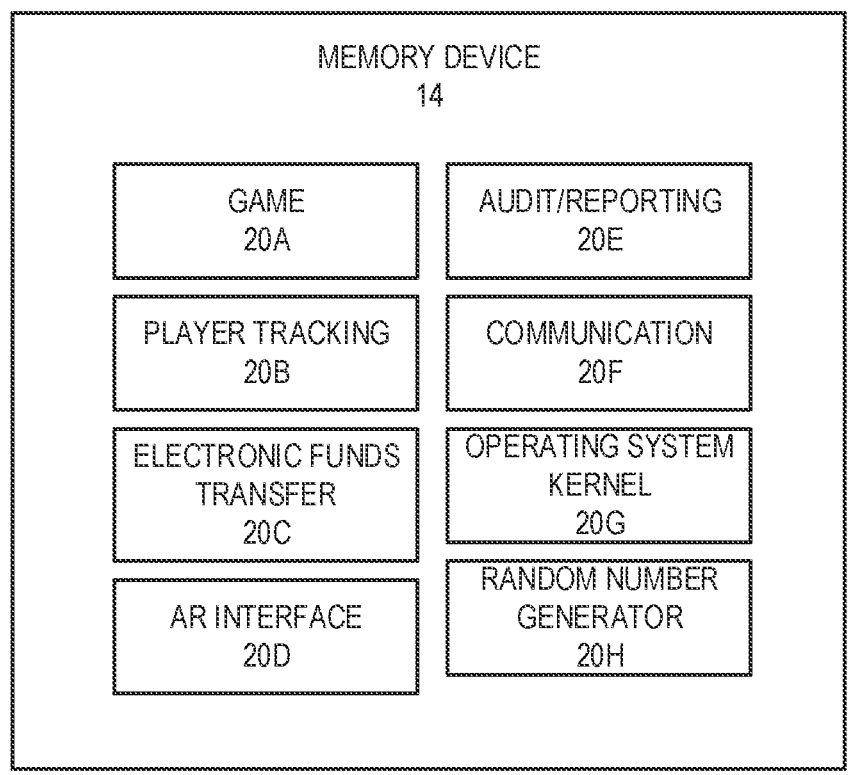
FIG. 1C is a block diagram that illustrates various functional modules of an electronic gaming device according to some embodiments.

An example of an electronic gaming machine (EGM) that can interact with mixed reality viewers according to various embodiments is illustrated in FIGS. 1A, 1B, and 1C in which FIG. 1A is a perspective view of an EGM 100 illustrating various physical features of the device, FIG. 1B is a functional block diagram that schematically illustrates an electronic relationship of various elements of the EGM 100, and FIG. 1C illustrates various functional modules that can be stored in a memory device of the EGM 100. The embodiments shown in FIGS. 1A to 1C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs typically include a number of standard features, many of which are illustrated in FIGS. 1A and 1B. For example, referring to FIG. 1A, an EGM 100 may include a support structure, housing or cabinet 105 which provides support for a plurality of displays, inputs, outputs, controls and other features that enable a player to interact with the EGM 100.

The EGM 100 illustrated in FIG. 1A includes a number of display devices, including a primary display device 116 located in a central portion of the cabinet 105 and a secondary display device 118 located in an upper portion of the cabinet 105. A plurality of game components 155 are displayed on a display screen 117 of the primary display device 116. It will be appreciated that one or more of the display devices 116, 118 may be omitted, or that the display devices 116, 118 may be combined into a single display device. The EGM 100 may further include a player tracking display 140, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the EGM 100.

The player tracking display 140 may be used to display a service window that allows the player to interact with, for example, their player loyalty account to obtain features, bonuses, comps, etc. In other embodiments, additional display screens may be provided beyond those illustrated in FIG. 1A. In some embodiments, one or more of the player tracking display 140, the credit display 120 and the bet display 122 may be displayed in one or more portions of one or more other displays that display other game related visual content. For example, one or more of the player tracking display 140, the credit display 120 and the bet display 122 may be displayed in a picture in a picture on one or more displays.

The EGM 100 may further include a number of input devices 130 that allow a player to provide various inputs to the EGM 100, either before, during or after a game has been played. For example, the EGM 100 may include input devices 130 that are a plurality of input buttons 130 that allow the player to select options before, during or after game play. The EGM may further include a game play initiation button 132 and a cashout button 134. The cashout button 134 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 1A and 1B includes a game play activation device in the form of a game play initiation button 132. It should be appreciated that, in other embodiments, the EGM 100 begins game play automatically upon appropriate funding rather than upon utilization of the game play activation device.

In some embodiments, one or more input devices 130 of the EGM 100 are one or more wagering or betting devices. One such wagering or betting device includes a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 152 and a touchscreen controller 154 (FIG. 1B). The player may interact with the EGM 100 by touching virtual buttons on one or more of the display devices 116, 118, 140. Accordingly, any of the above described input devices, such as the input buttons 130, the game play initiation button 132 and/or the cashout button 134 may be provided as virtual buttons on one or more of the display devices 116, 118, 140.

Referring briefly to FIG. 1B, operation of the primary display device 116, the secondary display device 118 and the player tracking display 140 may be controlled by a video controller 30 that receives video data from a processing circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 1A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the EGM 100 are generally configured to display one or more game and/or non-game images, symbols, and indicia. In certain embodiments, the display devices 116, 118, 140 of the EGM 100 are configured to display any suitable visual representation or exhibition of the movement of objects; dynamic lighting; video images; images of people, characters, places, things, and faces of cards; and the like. In certain embodiments, the display devices 116, 118, 140 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 136, a bill/ticket acceptor 128, and a coin acceptor 126 that allows the player to deposit coins into the EGM 100.

As illustrated in FIG. 1A, the EGM 100 may also include a currency dispenser 137 that may include a note dispenser configured to dispense paper currency and/or a coin generator configured to dispense coins or tokens in a coin payout tray.

The EGM 100 may further include one or more speakers 150 controlled by one or more sound cards 28 (FIG. 1B). The EGM 100 illustrated in FIG. 1A includes a pair of speakers 150. In other embodiments, additional speakers, such as surround sound speakers, may be provided within or on the cabinet 105. Moreover, the EGM 100 may include built-in seating with integrated headrest speakers.

In various embodiments, the EGM 100 may generate dynamic sounds coupled with attractive multimedia images displayed on one or more of the display devices 116, 118, 140 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 1B is a block diagram that illustrates logical and functional relationships between various components of an EGM 100. As shown in FIG. 1B, the EGM 100 may include a processing circuit 12 that controls operations of the EGM 100. Although illustrated as a single processing circuit, multiple special purpose and/or general purpose processing circuits, processors and/or processor cores may be provided in the EGM 100. For example, the EGM 100 may include one or more of a video processor, a signal processor, a sound processor and/or a communication controller that performs one or more control functions within the EGM 100. The processing circuit 12 may be variously referred to as a "controller," "microcontroller," "microprocessor" or simply a "computer." The processing circuit may further include one or more application-specific integrated circuits (ASICs).

Various components of the EGM 100 are illustrated in FIG. 1B as being connected to the processing circuit 12. It will be appreciated that the components may be connected to the processing circuit 12 through a system bus, a communication bus and controller, such as a USB controller and USB bus, a network interface, or any other suitable type of connection.

The EGM 100 further includes a memory device 14 that stores one or more functional modules 20. Various functional modules 20 of the EGM 100 will be described in more detail below in connection with FIG. 1C.

The memory device 14 may store program code and instructions, executable by the processing circuit 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (MRAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processing circuit through a universal serial bus (USB) hub (not shown) connected to the processing circuit 12.

In some embodiments, the EGM 100 may include a sensor, such as a camera in communication with the processing circuit 12 (and possibly controlled by the processing circuit 12) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 116, 118, 140 may be configured to display the image acquired by the camera as well as display the visible manifestation of the game in split screen or picture-in-picture fashion. For example, the camera may acquire an image of the player and the processing circuit 12 may incorporate that image into the primary and/or secondary game as a game image, symbol or indicia.

Various functional modules of that may be stored in a memory device 14 of an EGM 100 are illustrated in FIG. 1C. Referring to FIG. 1C, the EGM 100 may include in the memory device 14 a game module 20A that includes program instructions and/or data for operating a hybrid wagering game as described herein. The EGM 100 may further include a player tracking module 20B, an electronic funds transfer module 20C, a wide area progressive module 20D, an audit/reporting module 20E, a communication module 20F, an operating system 20G and a random number generator 20H. The player tracking module 20B keeps track of the play of a player. The electronic funds transfer module 20C communicates with a back-end server or financial institution to transfer funds to and from an account associated with the player. The AR interface module 20D interacts with an AR device 200 as described in more detail below. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

In some embodiments, an EGM 100 comprises a personal device, such as a desktop computer, a laptop computer, a mobile device, a tablet computer or computing device, a personal digital assistant (PDA), or other portable computing devices. In some embodiments, the EGM 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 1D:
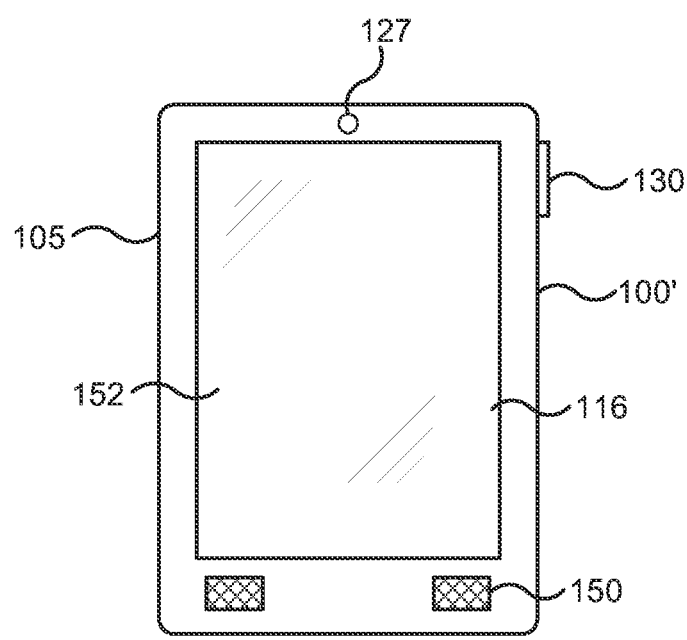
FIG. 1D is perspective view of a handheld electronic gaming device that can be configured according to some embodiments.

For example, referring to FIG. 1D, an EGM 100' may be implemented as a handheld device including a compact housing 105 on which is mounted a touchscreen of a primary display device 116 includes a digitizer 152. An input button 130 may be provided on the housing and may act as a power or control button. A camera 127 may be provided in a front face of the housing 105. The housing 105 may include one or more speakers 150. In the EGM 100', various input buttons described above, such as the cashout button, game-play activation button, etc., may be implemented as soft buttons on the touchscreen of the primary display device 116. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 1E:
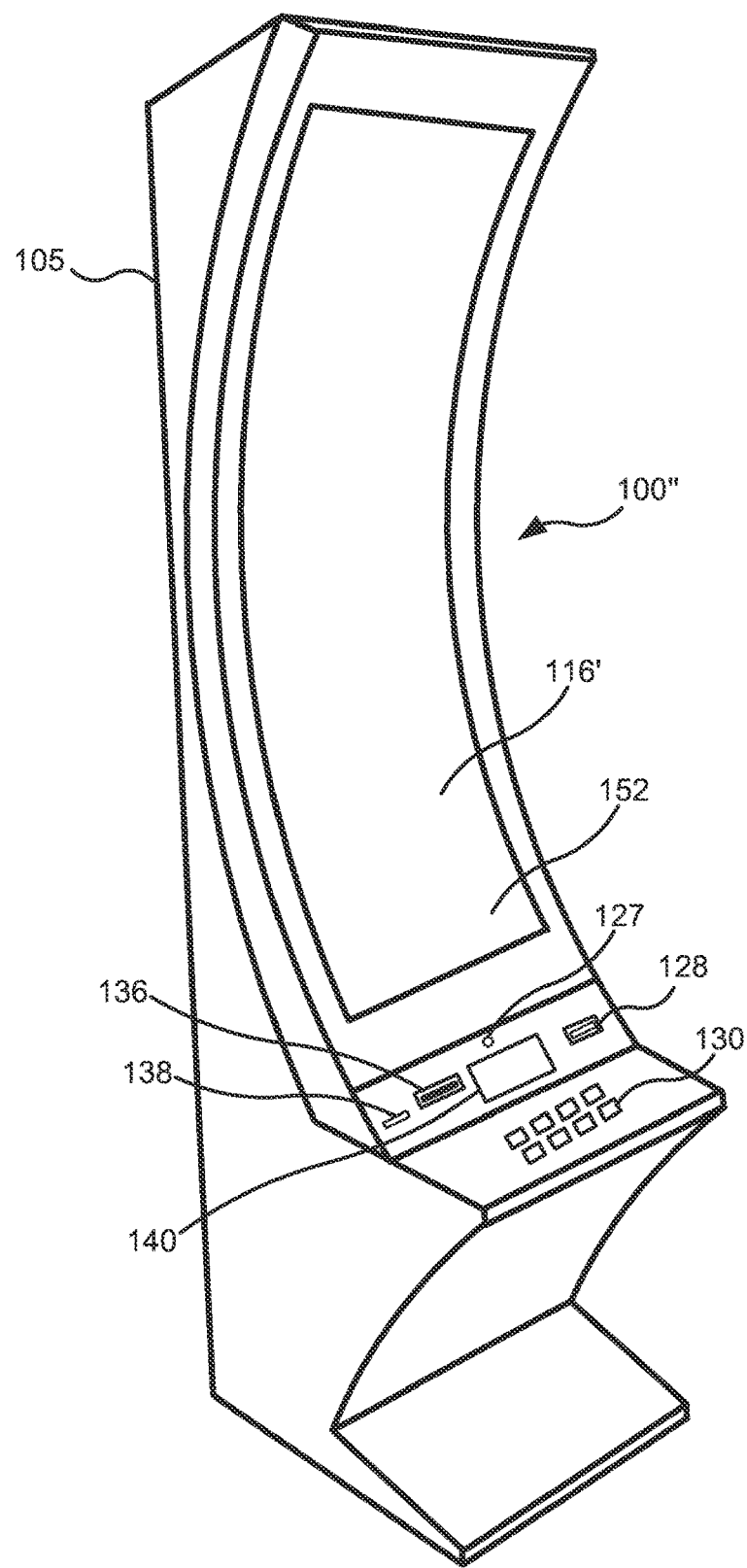
FIG. 1E is a perspective view of an electronic gaming device according to further embodiments.

FIG. 1E illustrates a standalone EGM 100" having a different form factor from the EGM 100 illustrated in FIG. 1A. In particular, the EGM 100" is characterized by having a large, high aspect ratio, curved primary display device 116' provided in the housing 105, with no secondary display device. The primary display device 116' may include a digitizer 152 to allow touchscreen interaction with the primary display device 116'. The EGM 100" may further include a player tracking display 140, a plurality of input buttons 130, a bill/ticket acceptor 128, a card reader 138, and a ticket generator 136. The EGM 100" may further include one or more cameras 127 to enable facial recognition and/or motion tracking.

Although illustrated as EGMs, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games.

EGM Network

Figure 2:
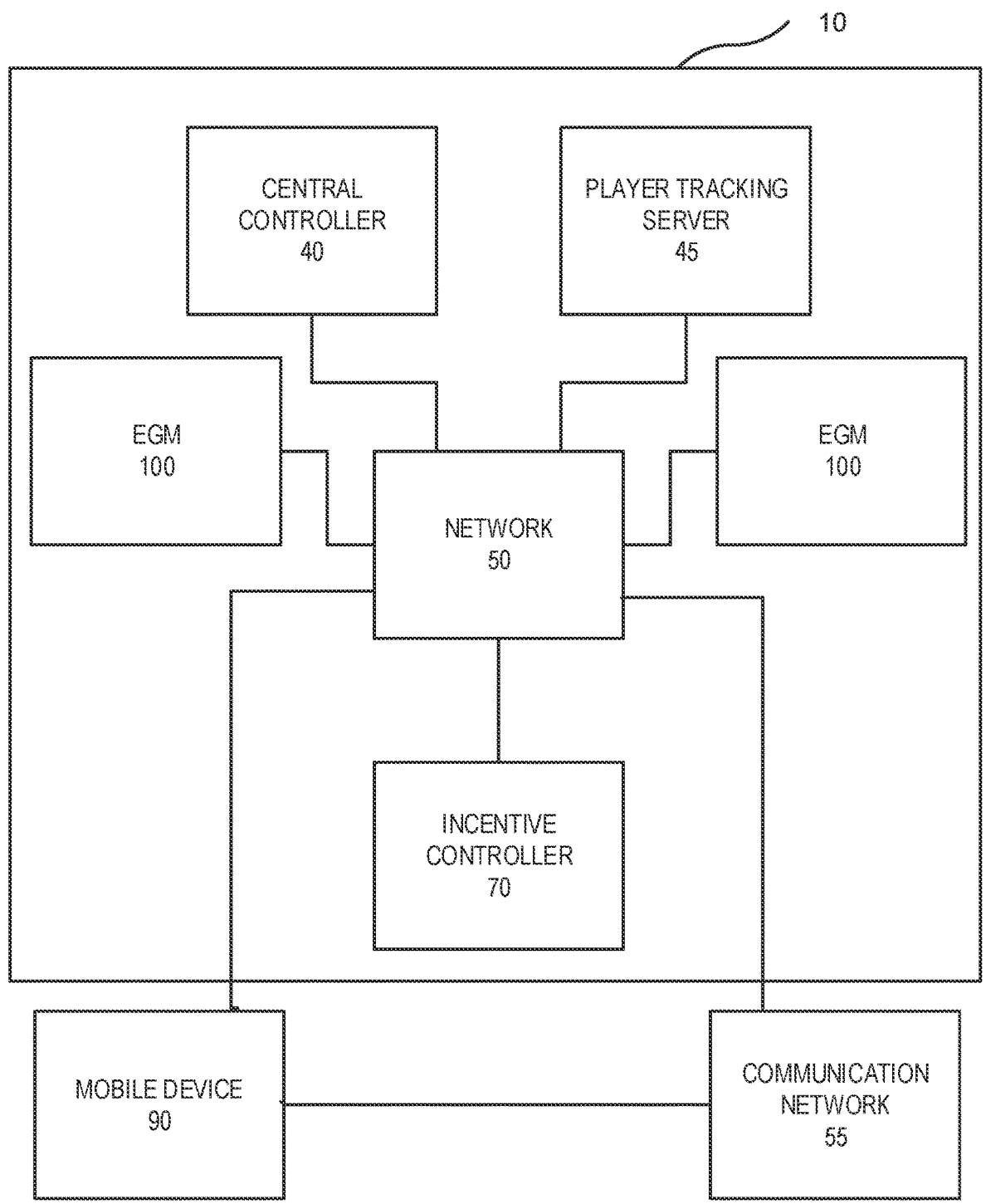
FIG. 2 is a schematic block diagram illustrating a network configuration for a plurality of gaming devices according to some embodiments.

Reference now made to FIG. 2, which is a schematic block diagram illustrating a network configuration for multiple gaming devices according to some embodiments. The network 10 includes one or more EGMs 100 that may be in communication with each other and/or at least one central controller 40 through a data network or remote communication link 50. The data network 50 may be a private data communication network that is operated, for example, by the gaming facility that operates the EGM 100. Communications over the data network 50 may be encrypted for security. The central controller 40 may be any suitable server or computing device which includes at least one processing circuit and at least one memory or storage device. In different such embodiments, the central controller 40 is a progressive controller or a processing circuit of one of the gaming devices in the gaming system. In these embodiments, the processing circuit of each gaming device is designed to transmit and receive events, messages, commands or any other suitable data or signal between the individual gaming device and the central server. The gaming device processing circuit is operable to execute such communicated events, messages or commands in conjunction with the operation of the gaming device. Moreover, the processing circuit of the central controller 40 is designed to transmit and receive events, messages, commands or any other suitable data or signal between the central controller 40 and each of the individual EGMs 100. The central controller 40 is operable to execute such communicated events, messages or commands in conjunction with the operation of the central server. It should be appreciated that one, more or each of the functions of the central controller 40 as disclosed herein may be performed by one or more EGM processing circuits. It should be further appreciated that one, more or each of the functions of one or more EGM processing circuits as disclosed herein may be performed by the central controller 40.

A player tracking server 45 may also be connected through the data network 50. The player tracking server 45 may manage a player tracking account that tracks the player's gameplay and spending, manages loyalty awards for the player, manages funds deposited or advanced on behalf of the player, and other functions. In some embodiments of the inventive concepts, the player tracking server 45 also keeps track of persistent enhancements that have been purchased or otherwise obtained by the player in connection with particular games.

An incentive controller 70 may be connected through the data network 50. The incentive controller 70 may be generate and/or send an identification of an electronic incentive award that the player may be able to unlock by performing various tasks and/or activities, which may be referred to as incentive objectives. In some embodiments, communications, including sending the identification of the electronic incentive award to a player's mobile device 90, may be performed using direct communications between the data network 50 and the mobile device 90 using wired and/or wireless communications components of the data network 50. A mobile device 90 may include any one of a smart phone, a tablet computer or computing device, a personal digital assistant (PDA), or other portable computing and/or telecommunications devices. Some embodiments provide that communications between the data network 50 and the mobile device 90 may be performed using one or more communication networks 55.

The incentive controller 70 may receive incentive progress data from an EGM 100 that the player is using to perform the incentive objectives and/or components thereof. The progress data may include information regarding the player's progress in meeting one or more of the incentive objectives. Additionally, the incentive controller 70 may provide the electronic incentive award to the mobile device 90 for the player to use the electronic incentive award on the mobile device 90. In some embodiments, the electronic incentive award has already been provided to the mobile device 90 in a locked configuration and the incentive controller may provide a key, such as data, for unlocking the electronic incentive award on the mobile device 90.

Electronic Incentive Awards

As described herein electronic incentive awards may be provided as nonmonetary incentives to encourage players to play specific EGM's 100. Some embodiments provide that an electronic incentive award may be presented as an unlockable electronic incentive award that includes content geared towards developing a relationship between the player and the brand and/or manufacturer of the EGM 100. By providing the electronic incentive awards, the manufacturer of the EGM 100 may provide motivation to the player to play on that EGM 100 and/or other EGMs 100 provided by that manufacturer. In this manner, additional personal value may be further provided to the player by providing a new achievement seeking game experience.

Figure 3:
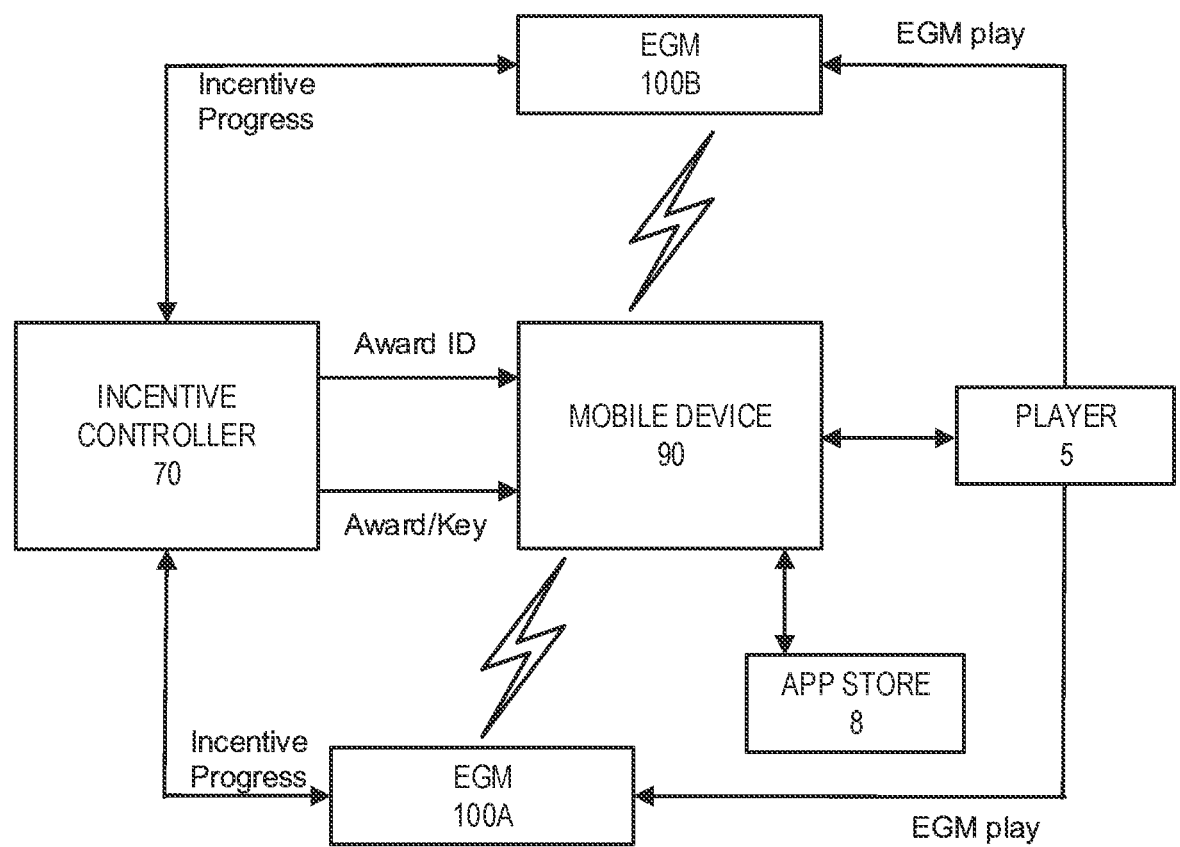
FIG. 3 is a schematic block diagram illustrating data flow for providing electronic incentive awards according to some embodiments.

Reference is now made to FIG. 3, which is a schematic block diagram illustrating data flow for providing electronic incentive awards according to some embodiments. Some embodiments the electronic incentive award may include digital content that, once received, may be consumed by a player 5 via a player's mobile device 90 or other processing device. For example, an electronic incentive award may include a picture, animation, song, sound effect, ringtone, model, visual art work, game, and/or background information, among others. Any of these example electronic incentive awards may correspond to a specific EGM 100 and/or to a theme that is associated with multiple EGMs 100 that are provided by that manufacturer. In some embodiments, the electronic incentive award may include information regarding a game developer, a game artist and/or other inside information regarding the development of the game.

Some embodiments provide that electronic incentive awards may include any digital content that may build up a relationship between the player 5 and the content and innovations provided in the manufacturer's games. Some embodiments provide that the electronic incentive awards may include early drafts, drawings, art books, three-dimensional models, animations, videos, trophies, game jingles, and/or mini-games, among others. In some embodiments, the player 5 may achieve, collect, save, view and/or use electronic incentive awards on their mobile device 90 or other processing device, such as a computer.

In some embodiments, the electronic incentive awards may include branded non-monetary digital giveaway incentives that the player 5 may want to achieve and/or collect. The electronic incentive awards may be applicable to existing games and new games. Some embodiments provide that electronic incentive awards may correspond to multiple games within a particular series and/or theme, such as, Egypt themed, jungle themed, underwater themed, pirate themed, icy themed, and/or licensed themes, among others. In some embodiments, the electronic incentive awards may be unlocked by achieving a specific incentive objective.

Some embodiments provide that the player 5 may want to collect as many electronic incentive awards as possible and thus prefer to play EGMs 100 that are provided by that manufacturer. In this manner, a fan following that corresponds to the manufacturer in addition to a specific game title may be developed.

Some embodiments provide that an award identification may be sent to the mobile device 90 of the player 5. The award identification may include information corresponding to the electronic incentive award including a description and/or graphical representation thereof. In some embodiments, the electronic incentive award may be provided to the mobile device 90 in a locked or partially functional state that may be unlocked and/or restored to the full electronic incentive award responsive to receiving an award key.

In some embodiments, an EGM 100A, 100B may display a graphic that invites the player 5 to sign up to be eligible for electronic incentive awards. For example, the mobile device 90 may connect with the EGM 100A, 100B via a wireless radio frequency communication link and/or may receive information optically by scanning a data code, such as a bar code or QR code, among others. In some embodiments, the mobile device 90 may receive information from the EGM 100A, 100B that directs the mobile device 90 to an application dispensary, such as an app store 8 or other online data repository. The mobile device 90 may receive an incentive award application that is executed on the mobile device 90 and that allows the mobile device 90 to register with the EGMs 100A, 100B to track the progress of the player 5 in achieving the objective for receiving the electronic incentive award.

Figure 4:
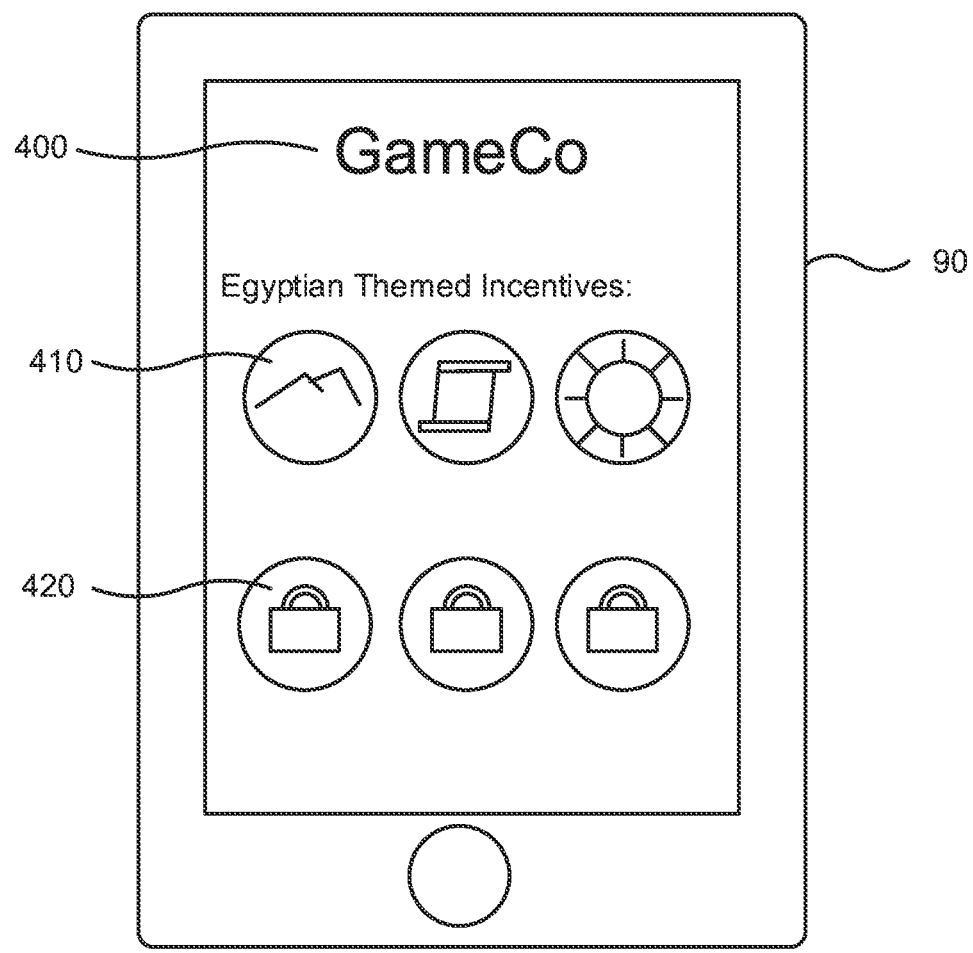
FIG. 4 is a schematic view of a display of a mobile device that illustrates a screen shot of an incentive award application according to some embodiments.

In some embodiments, the incentive award application may include a digital incentive wallet that may manage the status of multiple electronic incentive awards. For example, brief reference is now made to FIG. 4, which is a schematic view of a display of a mobile device that illustrates a screen shot of an incentive award application according to some embodiments. When executing the incentive award application, the mobile device 90 may display information corresponding to the name and/or logo 400 of the manufacturer of the EGM 100A, 100B. Icons or other graphical images may be displayed that identify different electronic incentive awards and their respective status. For example, unlocked electronic incentive awards 410 may be represented by icons or other graphical images that correspond to the specific electronic incentive award. In contrast, locked electronic incentive awards 420 may be represented by icons or other graphical images that indicate the locked status.

Referring back to FIG. 3, once the mobile device 90 receives the identification of the electronic incentive award from the incentive controller, the mobile device 90 may communicate with the EGMs 100A, 100B to determine incentive objectives that correspond to a given electronic incentive award. In some embodiments, an incentive objective may include playing a specific number of games on a given EGM 100A. Some embodiments provide that the specific number of games can be performed on selected different EGMs 100A, 100B. For example, the incentive objective may require that 100 games must be played on two different EGMs 100A, 100B that are provided by the same manufacturer. Some embodiments provide that the two different EGMs 100A, 100B are specifically identified, while other embodiments provide that the two different EGMs 100A, 100B may be selected by the player 5 from a group of different EGMs 100.

In some embodiments, the incentive objective may include playing a specific number of games on each of multiple different EGMs 100A, 100B. For example, the incentive objective may be that the player 5 plays 50 games on the first EGM 100A and 50 games on the second EGM 100B to achieve the incentive objective and receive the electronic incentive award. Some embodiments provide that the incentive objective includes multiple different tasks for the player 5 to perform to achieve the incentive objective. Incentive progress data may include the player's progress towards achieving the inventive objective.

In some embodiments, the player 5 may achieve the incentive objective over multiple different gaming sessions. The incentive progress corresponding to a first gaming session may be maintained after the first session is completed. For example, the player 5 may commence a first gaming session on a first EGM 100A. Based on communication between the first EGM 100A and the mobile device 90, the first EGM 100 may receive incentive progress data that corresponds to that player 5 from the incentive controller 70. During the first gaming session, data corresponding the player's progress in achieving the incentive objective may be tracked, updated and stored throughout the first gaming session. Once the first gaming session on the first EGM 100A is completed, the incentive progress data may be received by the incentive controller 70 from the first EGM 100A.

The player 5 may commence a second gaming session of the first EGM 100A. Some embodiments provide the first EGM 100A refers to a first game title that may be presented in more than one physical game cabinet. Based on communication between the first EGM 100A and the mobile device 90, the first EGM 100A may receive incentive progress data that corresponds to that player 5 from the incentive controller 70. During the second gaming session, data corresponding the player's progress in achieving the incentive objective may be tracked, updated and stored throughout the second gaming session. Once the second gaming session on the first EGM 100A is completed, the incentive progress data may be received by the incentive controller 70 from the first EGM 100A. Responsive to the incentive progress data indicating that the player 5 has achieved an incentive objective, the incentive controller 70 and/or the first EGM 100A may send the electronic incentive award and/or a key for unlocking the electronic incentive award to the mobile device 90. Additionally, during the first and/or second gaming sessions, the EGM 100A may display information corresponding to the incentive progress data so the player 5 may be updated regarding progress towards achieving the incentive objective.

In embodiments in which the incentive objective includes activities corresponding to different EGMs 100, the second gaming session may be played on the second EGM 100B. In such embodiments, when the second gaming session commences on the second EGM 100B, the second EGM 100B may receive incentive progress data that corresponds to that player 5 from the incentive controller 70. Similarly, once the second gaming session on the second EGM 100B is completed, the incentive progress data may be received by the incentive controller 70 from the second EGM 100B.

Figure 5:
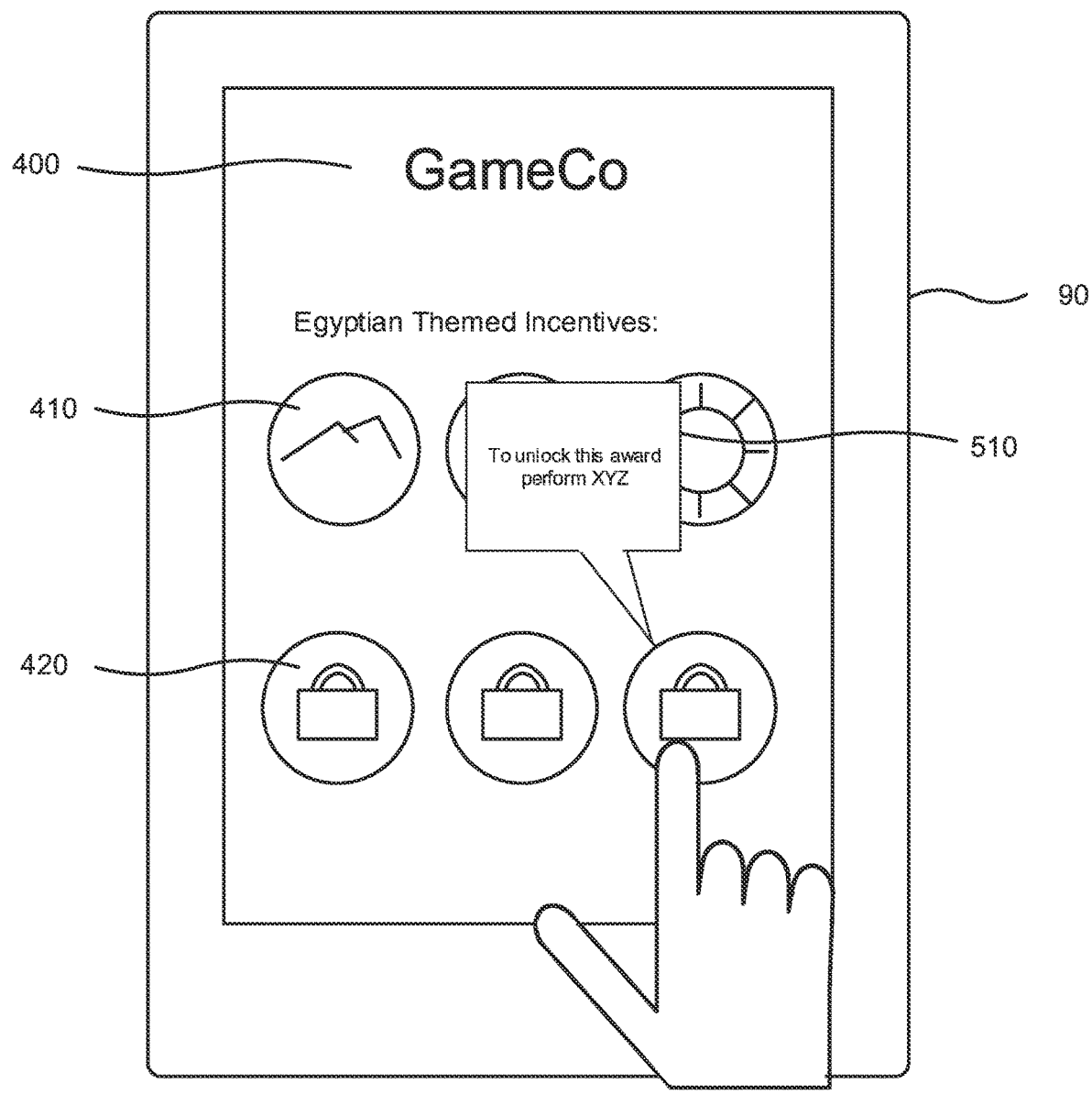
FIG. 5 is a schematic view of a display of a mobile device that illustrates a screen shot of an incentive award application according to some embodiments.

Some embodiments provide that a player 5 may unlock an electronic incentive award before receiving or installing the incentive award application. In such embodiments, instructions and explanation of the incentive award application may be displayed on the EGM 100A, 100B and/or the mobile device 90. For example, brief reference is now made to FIG. 5, which is a schematic view of a display of a mobile device 90 that illustrates a screen shot of an incentive award application according to some embodiments. In such embodiments, the player 5 may select an icon on the mobile device 90 corresponding to a locked electronic incentive award 420. In response, an informational window 510 may be displayed that identifies the incentive objective corresponding to that locked electronic incentive award. In an effort to achieve the electronic incentive award, the player 5 may prefer playing the EGM 100 that is identified in the incentive objective.

Some embodiments provide that any electronic incentive award may be triggered by a random game event. For example, if a specific game symbol (e.g., a treasure chest) appears multiple times on the screen, the electronic incentive award may be triggered. In some embodiments, this may be unrelated as to whether the player 5 achieves a monetary win. For example, a player 5 may be excited about the electronic incentive award regardless of a monetary win.

Figure 6:
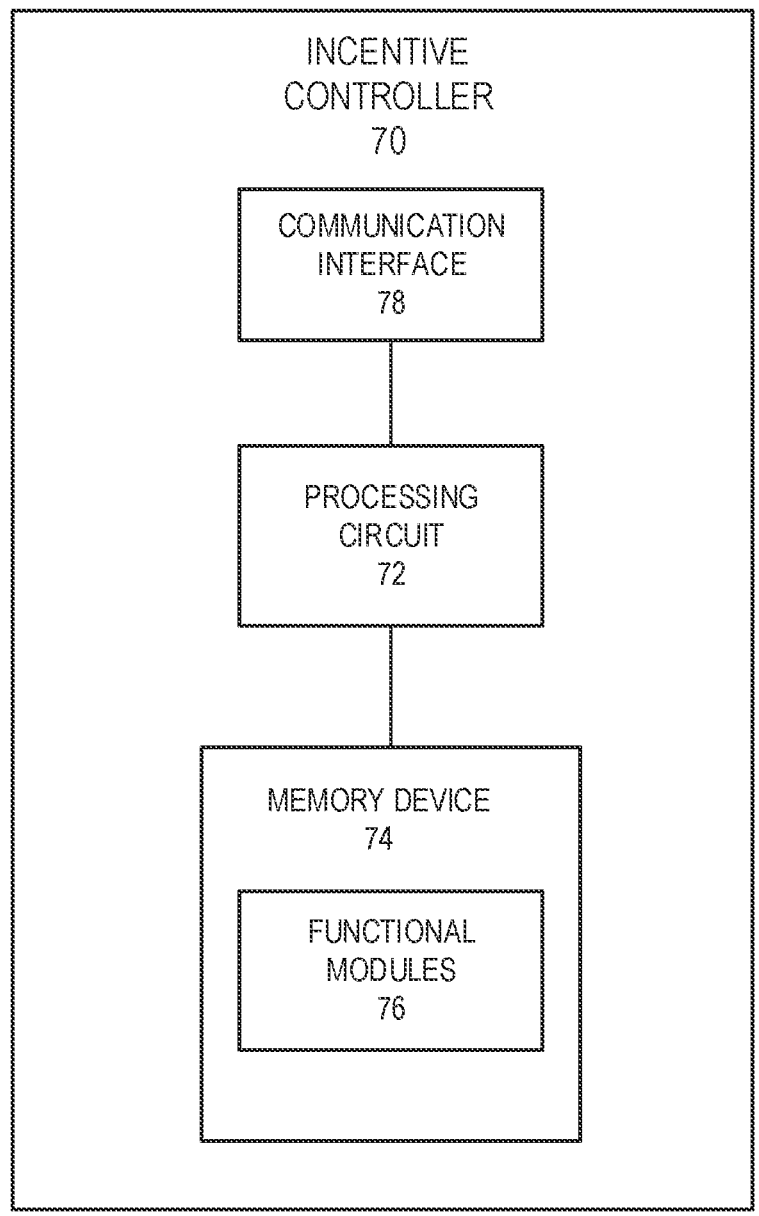
FIG. 6 is a schematic block diagram illustrating an electronic configuration for an incentive controller according to some embodiments.

FIG. 6 is a schematic block diagram illustrating an electronic configuration for an incentive controller according to some embodiments. As shown in FIG. 6, the incentive controller 70 may include a processing circuit 72 that controls operations of the incentive controller 70. Although illustrated as a single processing circuit, multiple special purpose and/or general purpose processing circuits, processors and/or processor cores may be provided in the incentive controller 70. For example, the incentive controller 70 may include one or more of a video processor, a signal processor, a sound processor and/or a communication controller that performs one or more control functions within the incentive controller 70. The processing circuit 72 may be variously referred to as a "controller," "microcontroller," "microprocessor" or simply a "computer." The processing circuit 72 may further include one or more application-specific integrated circuits (ASICs).

Various components of the incentive controller 70 are illustrated in FIG. 6 as being connected to the processing circuit 72. It will be appreciated that the components may be connected to the processing circuit 72 through a system bus, a communication bus and controller, such as a USB controller and USB bus, a network interface, or any other suitable type of connection.

The incentive controller 70 further includes a memory device 74 that stores one or more functional modules 76 for performing the operations described herein.

The memory device 74 may store program code and instructions, executable by the processing circuit 72, to control the incentive controller 70. The memory device 74 may include random access memory (RAM), which can include non-volatile RAM (NVRAM), magnetic RAM (MRAM), ferroelectric RAM (FeRAM) and other forms as commonly understood in the gaming industry. In some embodiments, the memory device 74 may include read only memory (ROM). In some embodiments, the memory device 74 may include flash memory and/or EEPROM (electrically erasable programmable read only memory). Any other suitable magnetic, optical and/or semiconductor memory may operate in conjunction with the gaming device disclosed herein.

The incentive controller 70 may include a communication interface 78 that enables the incentive controller 70 to communicate with remote devices, such as EGMs 100, mobile devices 90 and/or a player tracking server 45 over a wired and/or wireless communication network, such as a local area network (LAN), wide area network (WAN), cellular communication network, and/or other data communication network.

The incentive controller 70 may include one or more internal or external communication ports that enable the processing circuit 72 to communicate with and to operate with internal or external peripheral devices, such as display screens, keypads, mass storage devices, microphones, speakers, and wireless communication devices. In some embodiments, internal or external peripheral devices may communicate with the processor through a universal serial bus (USB) hub (not shown) connected to the processing circuit 72.

Figure 7:
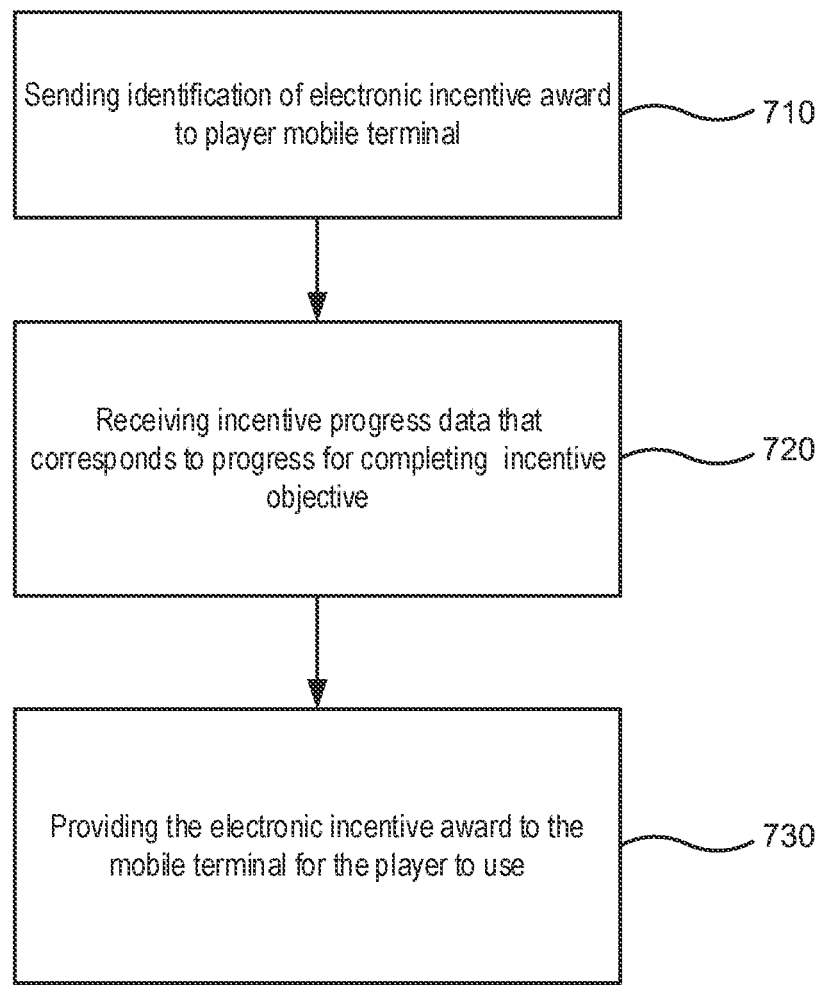
FIG. 7 is a flow diagram illustrating operations for systems and/or methods according to some embodiments.

Reference is now made to FIG. 7, which is a flow diagram illustrating operations for devices, systems and/or methods according to some embodiments. Operations include sending an identification of an electronic incentive award to a mobile device 90 of a player 5 (block 710). Some embodiments provide the electronic incentive award is received into the mobile device 90 in response to performing an action to complete an incentive objective on an electronic gaming machine (EGM). The identification of the electronic incentive award may be sent via a communication interface and to a mobile device that is associated with the player 5.

In some embodiments, the mobile device and the EGM are associated with one another using wireless communication that includes radio frequency (rf) communication and/or optical communication devices. Examples of rf communication include WiFi, near field communication (NFC) and/or Bluetooth, among others. Optical communication devices may use an image capture device, such as a camera, in the mobile device 90 to scan an optical code, such as a barcode and/or QR code, among others.

In some embodiments, sending the identification of the electronic incentive award is performed responsive to an event in a game being played on the EGM 100. Some embodiments provide that the event in the game includes displaying a given symbol and/or combination of symbols, and/or displaying a given symbol a given number of times. Examples of such symbols include symbols that correspond to a theme of the game, among others.

Operations may include receiving incentive progress data that corresponds to the action to complete the incentive objective and that indicates player progress towards completing the incentive objective (block 720). In some embodiments, the incentive progress data is received from the EGM 100 via the communication interface.

In response to the incentive progress data indicating that the player 5 has completed the incentive objective, operations may include providing the electronic incentive award to the mobile device 90 for the player 5 to use on the mobile device 90 (block 730).

Some embodiments provide that the electronic incentive award is associated with a game that is played on the EGM 100 and that the action to complete the incentive objective includes the player 5 playing the game on the EGM 100 a given number of times. Some embodiments provide that the identification of the electronic incentive award is unlocked to provide the electronic incentive award to the mobile device 90 for the player 5 to use on the mobile device in response to the incentive progress data indicating that the player 5 has played the game on the EGM 100 the given number of times.

In some embodiments, the electronic incentive award is associated with multiple games that may be played on different respective EGMs 100. For example, the action to complete the electronic incentive award includes the player 5 playing two or more different games for a total combined number of games. In some embodiments, the action to complete the incentive objective includes the player 5 playing each of the games a minimum number of times. For example, in the context of two games, the player 5 would play the first game a first number of times and the second game a second number of times. In such embodiment, the incentive progress data may include incentive progress data that indicates how many times that the player 5 has played each of the games.

In some embodiments, the electronic incentive award includes a graphic that is related to a game on the EGM 100 and that is viewable on the mobile device 90, an audio file that is playable on the mobile device 90, a game that is playable on the mobile device 90, audio and/or video content corresponding to development of the game, or audio and/or video content that is related to a theme of the game.

Some embodiments provide that the mobile device 90 may be associated with the EGM 2100 before the identification of the electronic incentive award is sent to the mobile device 90. The processing circuit may further send the identification of the electronic incentive award that the player 5 is eligible for via the communication interface to the EGM 100 for the EGM 100 to display to the player 5.

In some embodiments, the identification of the electronic incentive award may correspond to multiple different awards that may be based on a given game and/or group of games. In some embodiments, the incentive progress data may include data corresponding to which of the electronic incentive awards are unlocked and which ones of the electronic incentive awards are locked. Some embodiments may include sending instructions to the mobile device 90 to save the incentive progress data between multiple gaming sessions. For example, the player 5 may play different gaming sessions at different times. The different gaming sessions may be on the same game at the same or on different EGMs 100 that may be co-located or not co-located. For example, a first gaming session may occur at an EGM 100 that is at a first location and a second gaming session may occur at a different EGM 100 that is at a completely different casino, city, state and/or country.

In some embodiments, the processing circuit 72 may send, via the communication interface 78, an update message to the mobile device 90 that includes information corresponding to a new game and/or a new electronic incentive award that may be related to an electronic incentive award that the player 5 has received and/or is in the progress of working towards.

Some embodiments provide that the processing circuit 72 may send information corresponding to the action to complete the incentive objective to the mobile device 90 and/or the EGM 100 in response to receiving a user input via the mobile device 90 and/or the EGM 100.

Some embodiments provide that multiple electronic incentive awards are related to one another based on a theme and/or a specific game. The incentive progress data may be received by the processing circuit 72 via the communication interface 78 from the mobile device 90. The incentive progress data may include data that identifies which of the electronic incentive awards are unlocked and which of the electronic incentive awards are locked. In some embodiments, in responsive to one of the electronic incentive awards being locked, the processing circuit 72 may send a message to the mobile device 90 that includes an offer to sell the electronic incentive award to the player 5. In this manner, the player 5 may have the opportunity to receive the electronic incentive award without completing the corresponding incentive objective. This may allow a player 5 to achieve an electronic incentive award that is a component in a set of related awards that the player 5 may have already received.

Embodiments herein may provide that multiple different electronic incentive awards may be available for the player 5 to earn or unlock. In some embodiments, different electronic incentive awards may be offered at the same time. In other embodiments, once the action to complete the incentive objective is performed, then one or more subsequent electronic incentive awards may be offered. For example, once the processing circuit 72 provides the mobile device 90 with an electronic incentive award, the processing circuit may follow by sending an identification of a second electronic incentive awards to the mobile device 90.

Figure 8:
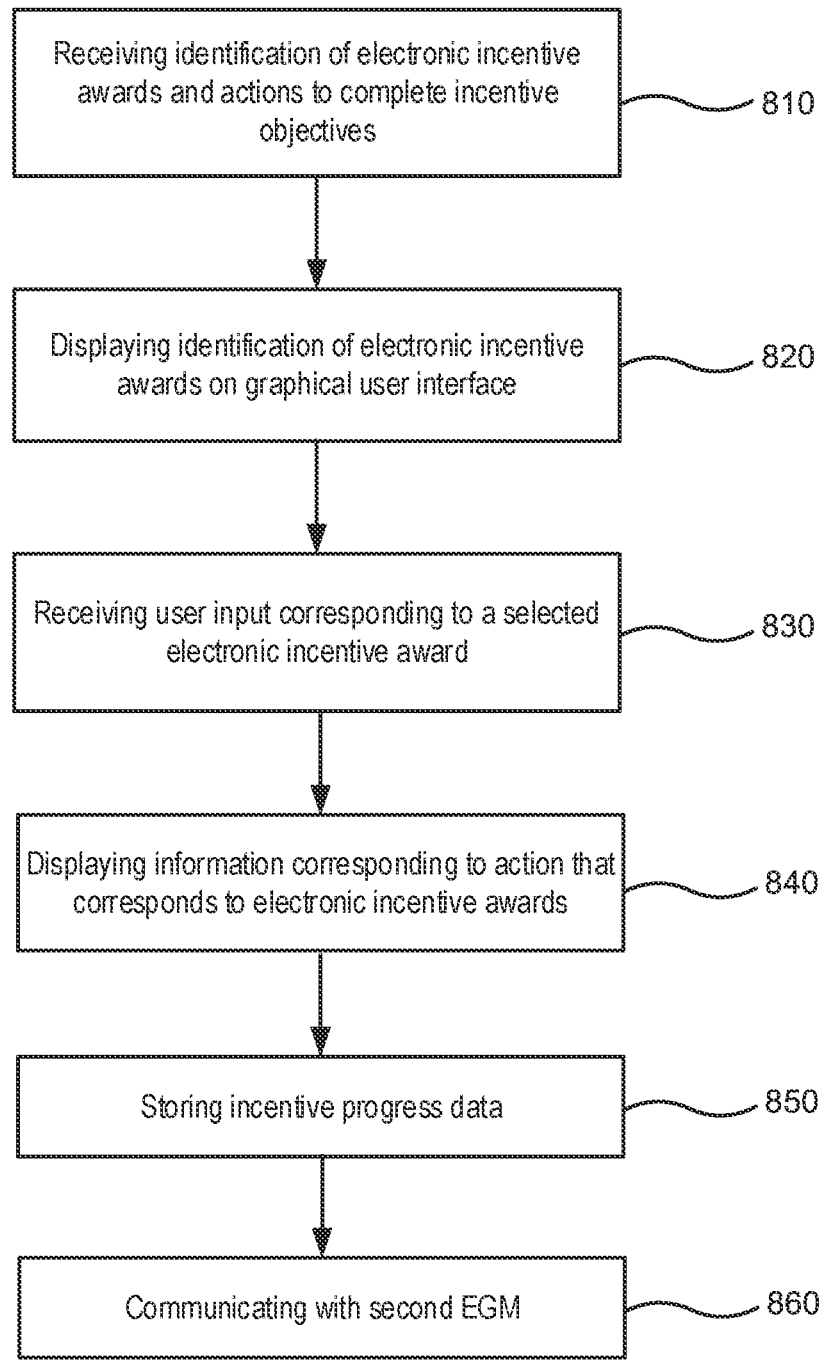
FIG. 8 is a flow diagram illustrating operations for devices, systems and/or methods according to some embodiments.

Reference is now made to FIG. 8, which is a flow diagram illustrating operations for devices, systems and/or methods according to some embodiments. Operations according to some embodiments include receiving, via a communication interface, data that includes an identification of one or more electronic incentive awards and actions to complete incentive objectives that correspond to the electronic incentive awards (block 810). In some embodiments, the actions to complete the incentive objectives are to be performed on an EGM. For example, responsive to completing an incentive objective, the corresponding electronic incentive award and/or data for unlocking the electronic incentive award may be received. After receiving or unlocking an electronic incentive award, such award may be accessible to the player.

Some embodiments include displaying the identification of each of the electronic incentive awards on a graphical user interface (block 820). Some embodiments provide that the graphical user interface may be in a player device, such as a mobile device, however, such embodiments are non-limiting. For example, the graphical user interface may be in an EGM according to some embodiments.

In some embodiments, operations include receiving a user input corresponding to the identification of one of the electronic incentive awards (block 830). In some embodiments, the input may be received via the graphical user interface.

Operations may include displaying information corresponding to an action that corresponds to the selected electronic incentive award (block 840). In some embodiments, the information corresponding to the action may be displayed via the graphical user interface.

In some embodiments, operations may include storing incentive progress data (block 850). In some embodiments, the incentive progress data may selectively include the player's progress in performing the actions, the player's progress in completing the incentive objectives, identification of locked electronic incentive awards, and identification of unlocked electronic incentive awards.

Some embodiments provide that the incentive objective defines actions that are to be performed on different EGM's. In such embodiments, the incentive progress data that is stored may be based on a first gaming session at a first time and on a first EGM. Operations may include wirelessly communicating with a second EGM that includes a same game as the first GM during a second gaming session that is after the first gaming session (block 860). Updated incentive progress data that includes the player's progress in performing the actions, the player's progress in completing the incentive objectives, identification of locked ones of the electronic incentive awards, and identification of unlocked ones of the electronic incentive awards corresponding to the second gaming session.

Player Tracking

In various embodiments, the gaming system includes one or more player tracking systems under control of the player tracking module 20B shown in FIG. 1C. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player 5 is issued a player identification card that has an encoded player identification number that uniquely identifies the player 5. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display 140. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

As noted above, a player's progress or status can be saved in other ways besides using a player tracking system, such as by generating, when the player 5 cashes out, a ticket including a printed code, such as a bar code or QR code, that identifies the player's session. When the player 5 wants to continue the game, the player 500 may insert the ticket including the printed code into the bill/ticket acceptor 128 of an EGM 100 (which may or may not be the same EGM 100 from which the ticket was issued). The EGM 100 reads the printed code and retrieves the player's status in response to the printed code.

Other Embodiments

In some embodiments, events within a given game may be teased and/or flashed back to the player. For example, the player 5 may be sent a message questions whether they liked a game element, such as audio and/or visual element. The player 5 may further receive a message that they can earn that game element if they keep playing through a given stage in the game, time duration, and/or wager amounts, among others.

Some embodiments provide that an electronic incentive award may include an audio and/or video of a particular game producer, designer, and/or artist of a given game. In such embodiments, the player 5 may be able to learn about the producer, designer, and/or artist corresponding to a game that the player 5 enjoys. The additional insider information may build a greater player loyalty to the manufacturer such that the player 5 seeks to identify other games by the manufacturer, producer, designer, and/or artist.

Some embodiments provide that an electronic incentive award may include behind the scenes out-takes and/or other information that corresponds to the development of the game and that was not publicized or used in the final version of the game. The un-publicized information may build a greater player loyalty to the manufacturer such that the player 5 seeks to identify other games by the manufacturer, producer, designer, and/or artist.

In some embodiments, the electronic incentive award may include a collection of different electronic incentive awards that, collectively, are a set of related elements. For example, a full set of art books may be achieved by unlocking multiple different electronic incentive awards. Similarly, a collection of audio elements that may collectively provide a soundtrack of a game and/or a collection of games having related themes may be achieved by unlocking multiple different electronic incentive awards. In some embodiments, the different incentive awards may include content that is not provided in an original game and thus may become rare insider incentives for the player 5 to achieve. Further examples include very raw drafts, character design approaches, three-dimensional trophies, background information about characters, character voices, sound effects, jingles, and/or music.

In some embodiments, a player 5 may be offered the opportunity to purchase an electronic incentive award, for example, to complete a series.

Some embodiments provide once a player 5 has received a set of a series of electronic incentive awards, that player 5 may be sent a coupon for tangible merchandise that may be branded by the game manufacturer. Such coupons may include discounts and/or may provide free merchandise.

In some embodiments, one or more mini-games may be provided to the player 5 that can be played to determine what electronic incentive awards may be provided. Examples include a memory matching game, a falling shape positioning game, and/or a symbol grouping game, among others. Some embodiments provide that such mini-games may be played on the EGM and/or on a player's mobile device.

Other EGM Features

Embodiments described herein may be implemented in various configurations for EGMs 100s, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to a EGM local processing circuit and memory devices. In such a "thick client" embodiment, the EGM local processing circuit executes the communicated computerized instructions to control any games (or other suitable interfaces) provided to a player.

In some embodiments, an EGM may be operated by a mobile device, such as a mobile telephone, tablet other mobile computing device. For example, a mobile device may be communicatively coupled to an EGM and may include a user interface that receives user inputs that are received to control the EGM. The user inputs may be received by the EGM via the mobile device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processing circuit of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player 5 prior to enabling that player 5 to place any wagers on any plays of any wagering games. In one example, the central server, central controller, or remote host identifies the player 5 by requiring a player account of the player 5 to be logged into via an input of a unique username and password combination assigned to the player. It should be appreciated, however, that the central server, central controller, or remote host may identify the player 5 in any other suitable manner, such as by validating a player tracking identification number associated with the player; by reading a player tracking card or other smart card inserted into a card reader (as described below); by validating a unique player identification number associated with the player 5 by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Embodiments provided herein may provide improved accessibility to wagering stations by including additional user interface technologies, such as augmented reality. Such embodiments may improve technological efficiency by coordinating the augmented reality with examples of different types of wagering stations.

Further Definitions and Embodiments

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A computer implemented method, comprising:
sending, using a processing circuit of an incentive controller and via a communication interface and to a mobile device that is associated with a player, an identification of an electronic incentive award that the player receives into the mobile device responsive to performing an action to complete an incentive objective on an electronic gaming machine (EGM), wherein the mobile device is associated with the EGM before the identification of the electronic incentive award is sent to the mobile device;
receiving, using the processing circuit of the incentive controller and via the communication interface and from the EGM, incentive progress data that corresponds to the action to complete the incentive objective and that indicates player progress towards completing the incentive objective;

responsive to the incentive progress data indicating that the player has completed the incentive objective on the EGM, automatically providing, using the processing circuit of the incentive controller, the electronic incentive award to the mobile device for the player to use on the mobile device; and sending, using the processing circuit on the incentive controller and via the communication interface and to the EGM for the EGM to display to the player using a graphical user interface of the EGM, the identification of the electronic incentive award that the player is eligible for, wherein the electronic incentive award comprises a graphic that is related to a game on the EGM and that is viewable on the mobile device based on the mobile device and the EGM being associated with one another, wherein the graphic comprises an icon or a graphical image, wherein the mobile device and the EGM are associated with one another using wireless communication wherein identification of the electronic incentive award comprises identification of a plurality of electronic incentive awards, wherein the plurality of electronic incentive awards are related to one another based on a theme, wherein the incentive progress data comprises identification of which ones of the plurality of electronic incentive awards are unlocked and which ones of the plurality of electronic incentive awards are locked, and wherein sending the identification of the electronic incentive award comprises sending, to the mobile device, instructions to save the incentive progress data between a plurality of gaming sessions.

2. The method of claim 1, wherein the processing circuit further sending, via the communication interface, a message that includes an offer, to the user, to sell the electronic incentive award to the user.

3. The method of claim 1, wherein the electronic incentive award is associated with a game that is played on the EGM, wherein the action to complete the incentive objective comprises the player playing the game on the EGM a given number of times, and wherein responsive to the incentive progress data indicating that the player has played the game on the EGM the given number of times, the identification of the electronic incentive award is unlocked to provide the electronic incentive award to the mobile device for the player to use on the mobile device.

4. The method of claim 1,
wherein the electronic incentive award is associated with a plurality of games that are played on a plurality of EGMs that comprises a first EGM and a second EGM, wherein the plurality of games comprises a first game on the first EGM and a second game on the second EGM, and
wherein the action to complete the electronic incentive award comprises the player playing the first game and the second game a given number of games combined.

5. The method of claim 4,
wherein the action to complete the incentive objective comprises the player playing the first game on the first EGM a first given number of games and the second game on the second EGM a second given number of games, and
wherein the incentive progress data comprises first incentive progress data that indicates that the player has played the first game the first given number of times and second incentive progress data that indicates that the player has played the second game the second given number of times,
wherein the first incentive progress data is generated before the second incentive progress data and
wherein the communication interface receives the first incentive progress data after the second incentive progress data is generated.

6. The method of claim 1, wherein the electronic incentive award comprises one of an audio file that is playable on the mobile device, a mobile game that is playable on the mobile device, audio content that corresponds to development of the game, video content that corresponds to development of the game, audio content that is related to a theme of the game and video content that is related to a theme of the game.

7. The method of claim 1,
wherein the mobile device is associated with the EGM before the identification of the electronic incentive award is sent to the mobile device, and
wherein the processing circuit further sending, via the communication interface and to the EGM for the EGM to display to the player, the identification of the electronic incentive award that the player is eligible for.

8. The method of claim 1,
wherein the plurality of gaming sessions comprises a first gaming session and a second gaming session that is after the first gaming session, and
wherein the first gaming session and the second gaming session occur at different locations relative to one another.

9. The method of claim 1,
wherein the electronic incentive award comprises a first electronic incentive award,
wherein the processing circuit further sending, via the communication interface, an update message to the mobile device, and
wherein the update message comprises one of information corresponding to a new game and a second electronic incentive award that is related to the first electronic incentive award that the player received.

10. The method of claim 1, wherein responsive to receiving a user input via the mobile device or the EGM, the processing circuit further operating to send, to one of the mobile device and the EGM, information corresponding to the action to complete the incentive objective.

11. The method of claim 1, wherein responsive to one of the plurality of electronic incentive awards being locked, the processing circuit operating to send, via the communication interface, a message to the mobile device that comprises an offer to sell the one of the plurality of the electronic incentive awards being locked to the player.

12. The method of claim 1, wherein sending the identification of the electronic incentive award is performed responsive to an event in a game being played on the EGM.

13. The method of claim 12, wherein the event in the game comprises one of displaying a given symbol, displaying a given combination of symbols, and displaying a given symbol a given number of times.

14. The method of claim 1,
wherein the identification of the electronic incentive award comprises an identification of a first electronic incentive award,
wherein the action to complete the incentive objective comprises an action to complete a first action to complete a first incentive objective, and
wherein responsive to providing the first electronic incentive award to the mobile device for the player to use on the mobile device, the processing circuit further operating to send, via the communication interface and to the mobile device, an identification of a second electronic incentive award that the player receives via the mobile device responsive to performing a second action to complete a second incentive objective.

15. A computer implemented method, comprising:
receiving, by a processing circuit, via a communication interface, data comprising an identification of each of a plurality of electronic incentive awards that correspond to an electronic gaming machine (EGM) and a plurality of actions to complete respective ones of a plurality of incentive objectives on the EGM, wherein a completed one of the plurality of incentive objectives causes a corresponding one of the plurality of electronic incentive awards to be unlocked and available for a player to use;
displaying, using the processing circuit, the identification of each of the plurality of electronic incentive awards on a graphical user interface;
receiving, by the processing circuit, a user input corresponding to the identification of a selected one of the plurality of electronic incentive awards via the graphical user interface;
receiving, by the processing circuit, via the communication interface and from the EGM, incentive progress data that corresponds to the action to complete the incentive objective and that indicates player progress towards completing the incentive objective; and
displaying, using the processing circuit and via the graphical user interface, information corresponding to an action of the plurality of actions that corresponds to the selected one of the plurality of electronic incentive awards, and
wherein the selected one of the plurality of electronic incentive awards comprises a graphic that is related to a game on the EGM and that is viewable on the mobile device,
wherein the graphic comprises an icon or a graphical image, and
wherein the incentive progress data comprises identification of which ones of the plurality of electronic incentive awards are unlocked and which ones of the plurality of electronic incentive awards are locked,
wherein the plurality of electronic incentive awards are related to one another based on a theme, and
wherein receiving the identification of the electronic incentive award comprises receiving, by the mobile device, instructions to save the incentive progress data between a plurality of gaming sessions.

16. The method of claim 15,
wherein the EGM comprises a first EGM;
wherein incentive progress data is stored based on a first gaming session at a first time,
wherein the processing circuit further:
wirelessly communicating with a second EGM that comprises a same game as the first EGM during a second gaming session that is after the first gaming session; and
storing updated incentive progress data that comprises: player progress in performing the plurality of actions; the player's progress in completing the plurality of incentive objectives;
identification of locked ones of the plurality of electronic incentive awards; and unlocked ones of the plurality of electronic incentive awards corresponding to the second gaming session.

17. The method of claim 15,
wherein the EGM is one of a plurality of EGMs,
wherein ones of the plurality of electronic incentive awards correspond to different ones of the plurality of EGMs, and
wherein the identification of each of the plurality of electronic incentive awards is provided sequentially relative to one another.

* * * * *